United States Patent
Kvieska et al.

(10) Patent No.: US 9,493,080 B2
(45) Date of Patent: Nov. 15, 2016

(54) METHOD FOR CONTROLLING A CHARGER FOR A MOTOR VEHICLE BATTERY WITH A REDUCTION OF LOSSES DUE TO SWITCHING

(71) Applicant: RENAULT s.a.s., Boulogne-Billancourt (FR)

(72) Inventors: Pedro Kvieska, Versailles (FR); Ludovic Merienne, Gif sur Yvette (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 111 days.

(21) Appl. No.: 14/408,193

(22) PCT Filed: Jun. 11, 2013

(86) PCT No.: PCT/FR2013/051343
§ 371 (c)(1),
(2) Date: Dec. 15, 2014

(87) PCT Pub. No.: WO2014/001676
PCT Pub. Date: Jan. 3, 2014

(65) Prior Publication Data
US 2015/0191091 A1 Jul. 9, 2015

(30) Foreign Application Priority Data

Jun. 26, 2012 (FR) ...................... 12 56026

(51) Int. Cl.
| | | |
|---|---|---|
| *H02J 7/00* | (2006.01) | |
| *B60L 11/18* | (2006.01) | |
| *H02J 7/02* | (2016.01) | |
| *H02M 7/217* | (2006.01) | |
| *H02M 1/00* | (2006.01) | |

(52) U.S. Cl.
CPC ........ *B60L 11/1809* (2013.01); *B60L 11/1812* (2013.01); *H02J 7/022* (2013.01);

(Continued)

(58) Field of Classification Search
CPC ...................................... Y02T 90/14
USPC ......................................... 320/109
See application file for complete search history.

(56) References Cited

U.S. PATENT DOCUMENTS

| | | | |
|---|---|---|---|
| 2001/0046188 A1* | 11/2001 | Koike | ............ G04C 3/00 368/204 |
| 2009/0067202 A1* | 3/2009 | Ichikawa | ............ B60L 11/1868 363/79 |

(Continued)

FOREIGN PATENT DOCUMENTS

| | | |
|---|---|---|
| FR | 2 943 188 | 9/2010 |
| FR | 2 964 510 | 3/2012 |

OTHER PUBLICATIONS

Dannehl, J. et al., "Limitations of Voltage-Oriented PI Current Control of Grid-Connected PWM Rectifiers With LCL Filters", IEEE Transactions on Industrial Electronics, vol. 56, No. 2, pp. 380-388, (Feb. 1, 2009), XP 011237609.

(Continued)

*Primary Examiner* — Suresh Memula
(74) *Attorney, Agent, or Firm* — Oblon, McClelland, Maier & Neustadt, L.L.P.

(57) ABSTRACT

A method for controlling a battery charger for a motor vehicle, the battery charger including an input filter connecting a three-phase power supply circuit to a buck converter, a boost circuit being connected to the buck converter and to the battery. The method includes: determining an output threshold voltage of the buck converter on the basis of the difference between a battery-current measurement and a battery-current request; keeping the output voltage of the buck converter constant; and controlling switches of the boost stage to be kept open.

4 Claims, 2 Drawing Sheets

Figure 1:
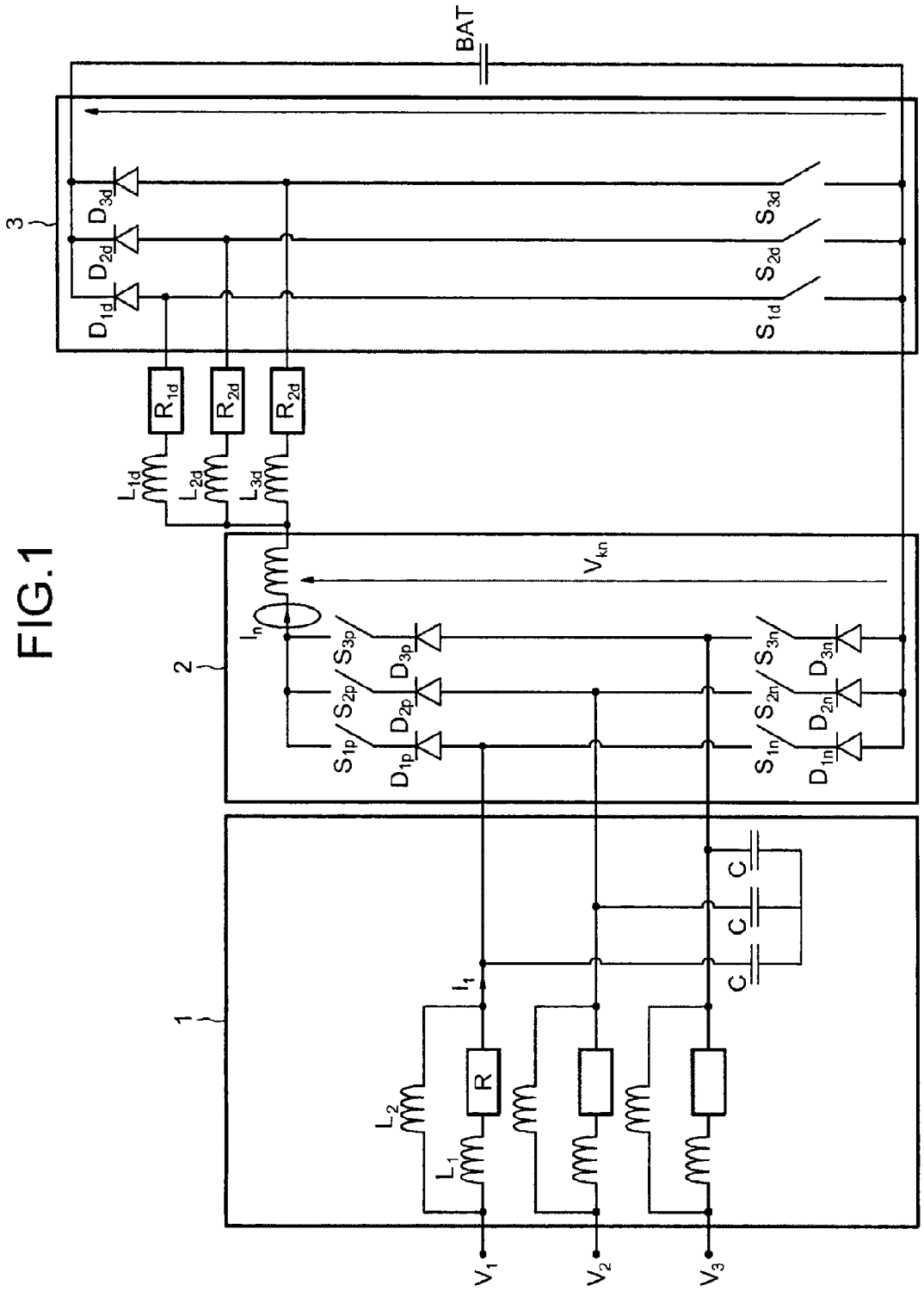

(52) U.S. Cl.
CPC ....... *B60L 2210/12* (2013.01); *B60L 2210/14* (2013.01); *H02M 7/217* (2013.01); *H02M 2001/0048* (2013.01); *Y02T 10/7005* (2013.01); *Y02T 10/7072* (2013.01); *Y02T 10/7225* (2013.01); *Y02T 10/7233* (2013.01); *Y02T 10/92* (2013.01); *Y02T 90/127* (2013.01); *Y02T 90/14* (2013.01)

(56) References Cited

U.S. PATENT DOCUMENTS

| | | | |
|---|---|---|---|
| 2011/0288710 A1* | 11/2011 | Ito | B60L 11/123 701/22 |
| 2012/0286740 A1 | 11/2012 | Loudot et al. | |
| 2013/0214729 A1 | 8/2013 | Gati et al. | |
| 2015/0091532 A1* | 4/2015 | Kvieska | H02J 7/022 320/137 |
| 2016/0129796 A1* | 5/2016 | Tomura | B60K 6/445 701/22 |

OTHER PUBLICATIONS

French Search Report Issued Mar. 6, 2013 in Application No. FR 1256026 Filed Jun. 26, 2012.
International Search Report Issued Jan. 2, 2014 in PCT/FR13/051343 Filed Jun. 11, 2013.

* cited by examiner

METHOD FOR CONTROLLING A CHARGER FOR A MOTOR VEHICLE BATTERY WITH A REDUCTION OF LOSSES DUE TO SWITCHING

The technical field of the invention is that of the control of high-power chargers, and more particularly, the reduction of losses in high-power chargers.

Existing battery chargers are functional at high power, for example 43 kW, and are highly efficient. However, at these power levels, a variation in efficiency of 1% represents a difference of 400 W in power consumption. On the other hand, high efficiency (for example 90%) represents 4 kW of heat to be dissipated.

A charger of this type for an electric vehicle, using a three-phase supply network, is described in patent application FR2964510. In this application, the losses in the additional inductance circuit and in the electrical machine are proportional to the current flowing therein. For various reasons, the neutral current setpoint must be greater than the input currents and the battery current at all times. Because of the modeling noise and uncertainties, a margin is required between the neutral current setpoint and these other two currents, in order to provide the aforementioned relationship. To charge a 300 V battery at 43 kW, the battery current must be 143 A. The present generation of vehicles comprises chargers in which the neutral current setpoint is 175 A.

Thus it is apparent that there is a need for increased efficiency and a reduction in the heat to be dissipated.

One object of the present patent application is to provide a method for controlling a battery charger which allows the neutral current to be equal to the battery current and as small as possible.

At present, this problem is resolved by reducing the neutral current setpoint. The lower the neutral current, the better is the efficiency of the charger. On the other hand, the higher the neutral current, the better is the charging current regulation. A compromise must therefore be found. Because of this compromise, the resolution of the problem by the means available at present limits the neutral current below which it is possible to descend. The neutral current limit is 175 A.

The following documents are known in the prior art.

FR2943188 discloses the architecture of a charger for a single-phase or three-phase network, together with its general control principle.

US2006209574 discloses an electrical power supply comprising a diode rectifier and a capacitance for the purpose of providing a constant voltage, followed by an autotransformer to regulate the output voltage level.

WO2011115330 discloses an automatic voltage regulator that uses a transformer and regulates the voltage level rapidly by modifying the number of turns of the secondary winding.

One object of the invention is to provide a method for controlling a battery charger for a motor vehicle, the battery charger comprising an input filter connecting a three-phase power supply circuit to a series chopper, a boost circuit being connected on the one hand to the series chopper, and on the other hand to the battery. The method comprises the following steps:

the threshold voltage at the output of the series chopper is determined on the basis of the difference between a battery current measurement and a battery current request, the output voltage of the series chopper is kept constant, and the switches of the boost stage are controlled in such a way that they are kept open.

The series chopper may comprise three phases, namely a high phase whose voltage is the greatest of the three phases, a low phase whose voltage is the smallest of the three phases, and an intermediate phase.

The output voltage of the series chopper can then be kept constant by executing the following steps:

the high and low switches of the intermediate phase of the series chopper are controlled so as to close, if the threshold voltage at the output of the series chopper is lower than the voltage of the low phase, the chopping of the high switch of the low phase is controlled so as to take place with a first duty cycle; otherwise, the high switch of the low phase is closed and the chopping of the low switch of the high phase is controlled so as to take place with a second duty cycle.

The current setpoint at the output of the series chopper may always be greater than the currents received from the three-phase power supply network and greater than the battery current.

Figure 2:
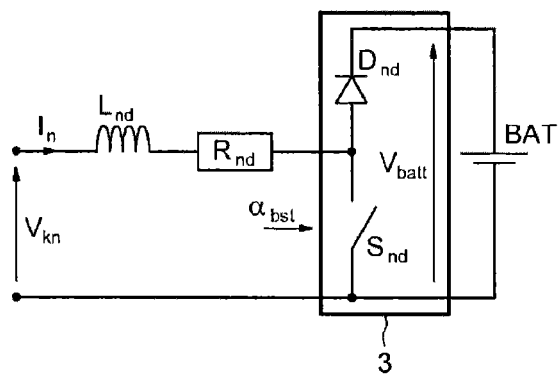
Figure 3:
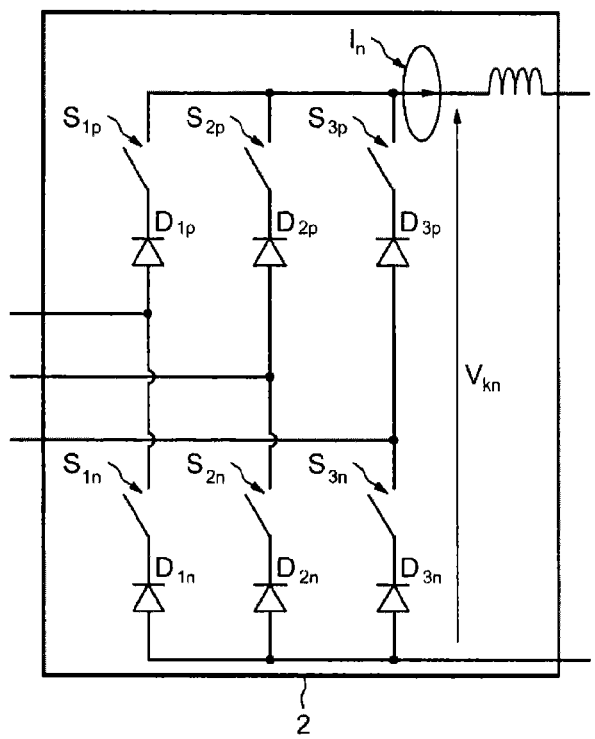
Figure 4:
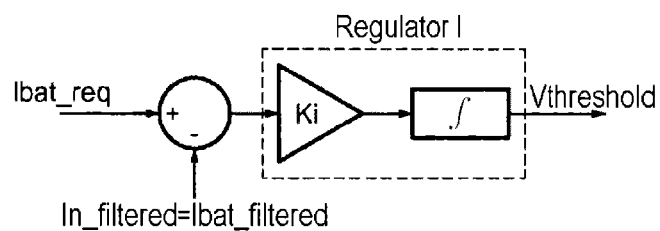

Other objects, characteristics and advantages will be apparent from the following description, provided solely by way of non-limiting example with reference to the attached figures, in which:

FIG. 1 shows a charger controlled by the control method according to the invention, FIG. 2 shows in a simplified manner the main elements of the boost circuit of this charger, FIG. 3 shows in greater detail the buck circuit of a charger controlled by the control method according to the invention, and FIG. 4 shows an integral regulator of a control system according to the invention.

FIG. 1 shows a charger controlled by the control method according to the invention. The figure shows an input filter 1 connecting the charger to the three-phase circuit, the input filter 1 being connected to the input of a buck circuit 2 delivering at its output a voltage $V_{kn}$ and a current $I_n$. The input filter can comprise, for each supply phase of the power supply network, a snubber circuit comprising a resistance R in series with an impedance $L_1$, this combination being connected in parallel with an impedance $L_2$. Each of these snubber circuits can filter the current flowing into the system; for example, the snubber circuit ($L_1$, $L_2$, R) can filter the current I from the phase $V_1$ of the power supply network. The output of each of the snubber circuits is also connected to a first plate of a capacitor C, the second plates being connected to one another, and to ground if necessary, in order to filter the common-mode components. The buck circuit 2, also known as a series chopper, is a voltage step-down circuit. The buck circuit 2 and the input filter 1 are included in an element called a junction box. The output of the buck circuit 2 is connected to the input of a boost circuit 3 by means of three parallel connections, each comprising an inductance in series with a resistance. The boost circuit 3, also known as a parallel chopper, is a voltage step-up circuit. Each of these parallel connections is connected to one branch of the boost circuit 3. The boost circuit 3 is connected to the battery BAT.

FIG. 2 shows in a simplified manner the main elements of a branch n of the boost circuit of this charger, where n varies from 1 to 3 for the boost circuit shown in FIG. 1, each branch having a diode $D_{nd}$ and a switch $S_{nd}$.

The voltage $V_{kn}$ and the current $I_n$ output from the buck circuit 2 are applied between the ground and a point from which run the three parallel connections, each including an inductance $L_{nd}$ and a resistance $R_{nd}$ in series. The resistance $R_{nd}$ is connected, on the one hand, to an anode of the diode $D_{nd}$ and to the switch $S_{nd}$. The other terminal of the switch $S_{nd}$ is connected to ground. The cathode of the diode $D_{nd}$ is connected to a battery BAT, which itself is also connected to ground. An additional intermediate inductance is placed between the connection common to the switches ($S_{1p}$, $S_{2p}$, $S_{3p}$) and the point from which the three parallel connections, each including an inductance $L_{nd}$ and a resistance $R_{nd}$ in series, run. This additional intermediate inductance provides greater freedom in determining the size of the windings of the electrical machine in relation to the charger.

The dynamic equation governing this branch of the circuit is as follows:

$$(Ls+R) \cdot I_n = V_{kn} - \alpha_{bst} \cdot V_{batt} \tag{Eq. 1}$$

Where:
L is the value of the impedance $L_{nd}$
R is the value of the resistance $R_{nd}$
$I_n$ is the output current of the buck circuit
$V_{kn}$ is the output voltage of the buck circuit
$V_{batt}$ is the charging voltage of the battery
$\alpha_{bst}$ is the duty cycle of the control of the switch $S_{nd}$, and
s is the Laplace operator.

The term "switch" denotes any switching means capable of interrupting the flow of current. A means of this kind includes, notably, transistors, and notably insulated gate bipolar transistors (abbreviated to IGBT in English).

Thus, for a boost circuit with three branches, as shown in FIG. 1, there are three branches, each receiving the current $I_n$ and the voltage $V_{kn}$, all three being connected in parallel to the battery BAT. A first branch comprises an inductance $L_{1d}$, a resistance $R_{1d}$, a diode $D_{1d}$, and a switch $S_{1d}$. A second branch comprises an inductance $L_{2d}$, a resistance $R_{2d}$, a diode $D_{2d}$, and a switch $S_{2d}$. A third branch comprises an inductance $L_{3d}$, a resistance $R_{3d}$, a diode $D_{3d}$, and a switch $S_{3d}$.

In the case of a boost circuit 3 with three branches, the application of equation 1 is simplified by comparison with the real case in view of the fact that the three switches ($S_{1d}$, $S_{2d}$, $S_{3d}$) of the boost circuit are controlled in the same way. It is assumed that if a duty cycle $\alpha_{bst}=1$ is used, the corresponding switch is open.

In the simplified formulation of equation 1, when the switches are open the boost circuit is also open, and the battery is therefore connected to the buck circuit.

When the boost circuit is closed, it isolates the battery from the charging currents. The current flowing to the battery is therefore modulated as follows:

$$I_{batt} = \alpha_{bst} * I_n \tag{Eq. 2}$$

To optimize efficiency, the current In must be as low as possible. The value of $\alpha_{bst}$ must therefore always be equal to 1.

Additionally, the neutral phase current must be kept constant over the range of the variable $\alpha_{bst}$. Since this value is now assumed to be locked, the neutral current can be kept constant only by controlling the voltage $V_{kn}$.

Thus, in order to keep the neutral current constant, the voltage $V_{kn}$ must be constant. The buck circuit must therefore be controlled in such a way that the output voltage is constant on average.

FIG. 3 shows the buck circuit in greater detail.

The buck circuit comprises three parallel input connections, each carrying one phase of the power supply network, and each connected to a pair of switches forming a branch of the buck circuit.

The first connection is connected between a first switch H, denoted $S_{1N}$, and a second switch B, denoted $S_{1P}$, of a first branch of the buck circuit.

The second connection is connected between a first switch H, denoted $S_{2N}$, and a second switch B, denoted $S_{2P}$, of a second branch of the buck circuit.

The third connection is connected between a first switch H, denoted $S_{3N}$, and a second switch B, denoted $S_{3P}$, of a third branch of the buck circuit.

The switches H are also called high switches, and the switches B are called low switches.

The first switches ($S_{1N}$, $S_{2N}$, $S_{3N}$) of each phase of the buck circuit are also each connected to the anode of a first diode ($D_{1N}$, $D_{2N}$, $D_{3N}$) and to the cathode of a second diode ($D_{1P}$, $D_{2P}$, $D_{3P}$). The cathodes of the first diodes ($D_{1N}$, $D_{2N}$, $D_{3N}$) are connected jointly to a first output of the buck circuit.

The second switches ($S_{1P}$, $S_{2P}$, $S_{3P}$) of each phase of the buck circuit are also each connected to the anode of a second diode ($D_{1P}$, $D_{2P}$, $D_{3P}$) at one of their poles, and are connected jointly to a second output of the buck circuit at their other pole. An impedance is placed in series with the second output of the buck circuit.

The sinusoidal voltages of the three-phase network at the input of the buck circuit are chopped by the switches into a voltage $V_{kn}$. The voltage $V_{kn}$ created in this way exhibits abrupt variations due to the chopping principle itself. When considered as a whole, the system exhibits an inertia due to the capacitances and inductances. This inertia acts as a filter allowing only the low frequencies to persist. The term "low frequencies" denotes frequencies below 500 Hz. It is the mean value of this filtered voltage that enables the current to be controlled. Henceforth, any quantity which does not vary or which varies only at frequencies below 500 Hz will be considered to be a constant.

The maximum voltage of the buck circuit is obtained by making the circuit operate as a rectifier bridge, that is to say with all the switches closed. This will provide a rectified voltage $V_{kn}$ which is constantly at a level of more than one and a half times the amplitude of the voltages of the three input phases. Consequently, with a suitable control system, it is possible to have a constant voltage $V_{kn}$ that may be up to 1.5 times the amplitude of the input voltage.

In order to be able to control the voltage $V_{kn}$, a measurement of the electrical angle $\theta_{elec}$ of the network must be available. The voltages of the three-phase network ($V_1$, $V_2$, $V_3$) vary in the following way:

$$\begin{cases} V_1 = A \cdot \sin(\omega \cdot t) \\ V_2 = A \cdot \sin\left(\omega \cdot t - \dfrac{2\pi}{3}\right) \\ V_3 = A \cdot \sin\left(\omega \cdot t + \dfrac{2\pi}{3}\right) \end{cases} \tag{Eq. 3}$$

Where:
A is the amplitude of the network voltage
$\omega$ is the frequency of the network The value of the product $\omega t$ at each instant t is called the electrical angle, denoted $\theta_{elec}$. On the basis of this value, therefore, it is possible to determine the voltages of each phase.

The following conventions will be used below to classify the phases of the buck circuit 2.

The phase having the highest voltage will be called the high phase.

The phase having the lowest voltage will be called the low phase.

The phase having a voltage between the other two will be called the intermediate phase.

According to the electrical angle $\theta_{elec}$, it can therefore be seen that there are six different operating segments, each having its high, intermediate and low phases.

The intermediate phase is used as a flywheel circuit at all times. For this purpose, the low switches B and the high switches H corresponding to this phase are closed. This has the double benefit of providing a current path independent of the behavior of the high and low branches while not limiting the voltages $V_{kn}$ that can be applied.

Thus the buck circuit is protected from destruction, because the generated current provides a return path at all times. Furthermore, the maximum voltage $V_{kn}$ can be obtained at any time by closing the high switch H of the low phase and the low switch B of the high phase.

The voltage swings between the high and intermediate phases, and between the intermediate and low phases, are determined on the basis of the value $\theta_{elec}$, these two voltage swings being called $V_{haut}$ and $V_{bas}$ respectively:

$$V_{haut}=V_{ph\_haut}-V_{ph\_int} \quad \text{(Eq. 4)}$$

$$V_{bas}=V_{ph\_int}-V_{ph\_bas} \quad \text{(Eq. 5)}$$

Where
$V_{ph\_haut}$ is the high phase voltage,
$V_{ph\_int}$ is the intermediate phase voltage, and
$V_{ph\_bas}$ is the low phase voltage.

It is also assumed that these two voltages $V_{haut}$ and $V_{bas}$ are positive at every instant.

Additionally, if current flows at each instant, one diode of the chopper must be conducting. The voltage $V_{kn}$ is defined by the state of the high switch H of the low phase and the state of the low switch B of the high phase.

If these two switches are open, then $V_{kn}=0$. The current flows through the flywheel circuit.

If the high switch H of the low phase is closed while the low switch B of the high phase is open, then $V_{kn}=V_{bas}$. The current returns via this high switch H because the voltage there is lower.

If the low switch B of the high phase is closed while the high switch H of the low phase is open, then $V_{kn}=V_{haut}$. The current arrives via this low switch B because the voltage there is greater.

If both switches are closed, then $V_{kn}=V_{haut}+V_{bas}$. The current arrives via the high phase and returns via the low phase.

To minimize losses, chopping must be kept to a minimum in order to reduce the switching losses. Thus a priority phase, for example the low phase, is defined for each segment.

If the voltage $V_{kn}$ to be provided is below the voltage $V_{bas}$, then the high switch H of the low phase will be used to chop the voltage according to a first duty cycle $\alpha_{bas}$ (0 for always open and 1 for always closed). Therefore, $$V_{kn}=\alpha_{bas}\cdot V_{bas} \quad \text{(Eq. 6)}$$

By adjusting the duty cycle $\alpha_{bas}$, the desired voltage $V_{kn}$ can be provided.

If the voltage $V_{kn}$ to be provided is higher than the voltage $V_{bas}$, then the high switch H of the low phase will be closed and the low switch B of the high phase will be used to chop the voltage according to a second duty cycle $\alpha_{haut}$. In this case, $$V_{kn}=V_{bas}+\alpha_{haut}\cdot V_{haut} \quad \text{(Eq. 7)}$$

A constant voltage can be adjusted up to 1.5*A.

Evidently, therefore, not more than one switch is chopping at any instant, and a constant voltage is obtained at the output of the buck circuit 2.

The current entering the battery can therefore be regulated by modifying the voltage at the output of the buck circuit. Since the battery is at 300 V, a slightly higher voltage threshold must be set for charging it.

For this purpose, the threshold voltage required for charging the battery by integral regulation is determined on the basis of the difference between the battery current request Ibat_req and the filtered battery current. On the basis of the determined threshold voltage, the duty cycles are determined according to the cases described above.

Alternatively, the method can also determine the duty cycle control settings of the switches of the buck stage used to obtain this current threshold.

FIG. 4 shows the main elements of an integral regulator 4 included in a control system executing the method described above. The integral regulator 4 can be used to determine the duty cycle control settings corresponding to the voltage threshold output from the buck circuit. In the present case, the filtered neutral current is equal to a measurement of the battery current, given that the boost circuit is always open.

The integral regulator 4 determines a threshold voltage setpoint which is transmitted to the buck circuit control means, which then determines duty cycles on the basis of this voltage threshold.

The method for controlling the battery charger thus makes it possible to limit the electrical losses due to switching.

The invention claimed is:

1. A method for controlling a battery charger for a motor vehicle, the battery charger including an input filter connecting a three-phase power supply circuit to a series chopper, a boost circuit connected to the series chopper, and to the battery, the method comprising:
   determining a threshold voltage at an output of the series chopper on the basis of the difference between a battery current measurement and a battery current request;
   keeping the output voltage of the series chopper constant; and
   controlling switches of the boost circuit such that they are kept open.

2. The control method as claimed in claim 1, the series chopper including three phases, of a high phase whose voltage is greatest of the three phases, a low phase whose voltage is smallest of the three phases, and an intermediate phase,
   wherein the output voltage of the series chopper is kept constant by executing:
   controlling high and low switches of the intermediate phase of the series chopper to close;
   if the threshold voltage at the output of the series chopper is lower than the voltage of the low phase, controlling the chopping of the high switch of the low phase to take place with a first duty cycle;
   otherwise, closing the high switch of the low phase and controlling chopping of the low switch of the high phase to take place with a second duty cycle.

3. The method as claimed in claim 2, wherein current setpoint at the output of the series chopper is always greater than currents received from the three-phase power supply circuit and greater than battery current.

4. The method as claimed in claim 1, wherein current setpoint at the output of the series chopper is always greater than currents received from the three-phase power supply circuit and greater than battery current.

* * * * *